United States Patent
Foehr et al.

(10) Patent No.: US 7,869,068 B2
(45) Date of Patent: Jan. 11, 2011

(54) PRINTER DRIVER EXTENSION AND RELATED METHOD

(75) Inventors: Oliver H. Foehr, North Andover, MA (US); Marc C Kunz, North Andover, MA (US); Brian D. Dodge, Norfolk, MA (US)

(73) Assignee: Zoran Corporation, Sunnyvale, CA (US)

( * ) Notice: Subject to any disclaimer, the term of this patent is extended or adjusted under 35 U.S.C. 154(b) by 1644 days.

(21) Appl. No.: 10/607,842

(22) Filed: Jun. 27, 2003

(65) Prior Publication Data

US 2005/0185211 A1 Aug. 25, 2005

(51) Int. Cl.
*G06F 15/00* (2006.01)

(52) U.S. Cl. .............. 358/1.15; 715/733; 715/735; 715/740; 715/744; 715/745; 715/746; 715/747; 715/764; 715/765; 715/768; 715/866; 345/594

(58) Field of Classification Search .......... 358/1.15; 715/733, 735, 740, 744–747, 764–765, 768, 715/866

See application file for complete search history.

(56) References Cited

U.S. PATENT DOCUMENTS

| 5,726,883 A * | 3/1998 | Levine et al. ............... 700/83 |
| 6,118,939 A * | 9/2000 | Nack et al. ............... 717/109 |
| 6,275,227 B1 * | 8/2001 | DeStefano ............... 369/30.01 |
| 6,335,795 B1 | 1/2002 | Neuhard et al. ............ 358/1.15 |
| 6,820,268 B2 * | 11/2004 | Williamson et al. ......... 719/315 |
| 6,831,752 B1 * | 12/2004 | Matsuo ................. 358/1.13 |
| 6,967,728 B1 * | 11/2005 | Vidyanand ............... 358/1.12 |
| 7,046,818 B2 * | 5/2006 | Ratnakar et al. ............ 382/100 |
| 7,053,895 B2 * | 5/2006 | Yamagata et al. ............ 345/428 |
| 7,366,991 B1 * | 4/2008 | Snapkauskas et al. ....... 715/762 |
| 2002/0105548 A1 * | 8/2002 | Hayton et al. ............... 345/764 |
| 2002/0163660 A1 * | 11/2002 | Iwai ..................... 358/1.13 |
| 2003/0117644 A1 * | 6/2003 | Coleman ................ 358/1.15 |
| 2004/0015842 A1 * | 1/2004 | Nanivadekar et al. ....... 717/109 |
| 2004/0130745 A1 * | 7/2004 | Fabel et al. ............... 358/1.15 |

FOREIGN PATENT DOCUMENTS

| EP | 0 304 072 A2 | 2/1989 |
| EP | 0 304 072 A3 | 2/1989 |
| EP | 0 803 809 A2 | 10/1997 |
| WO | 01/67286 A2 | 9/2001 |

OTHER PUBLICATIONS

International Search Report for PCT/US04/020140 dated Feb. 23, 2005.
Written Opinion of the International Searching Authority for PCT/US04/020140, May 6, 2005.

* cited by examiner

*Primary Examiner*—Edward L Coles
*Assistant Examiner*—Mark R Milia
(74) *Attorney, Agent, or Firm*—Lando & Anastasi, LLP (57) ABSTRACT

A software plug-in module extends the functionality of a standard printer driver. For example, the plug-in facilities the ability to provide a customizable user interface. The plug-in also facilitates the use of multiple forms of color management and half-tone screening. Further, the plug-in provides a system and method for determining the status of a printing device.

17 Claims, 4 Drawing Sheets

PRINTER DRIVER EXTENSION AND RELATED METHOD

FIELD OF THE INVENTION

The invention relates generally to printer drivers and more specifically to an extension for an industry standard printer driver.

BACKGROUND OF THE INVENTION

Generally, there are two types of printer drivers—monolithic drivers and table-driven drivers. Monolithic drivers are custom pieces of software code that translate the print job from computer application language to a format readable by a printer. Monolithic drivers require a large amount of software code and thus are costly to develop. Alternatively, table-driven drivers were developed because each driver typically performs a similar set of functions. Although the commands for performing certain functions may be different for various, there is a common set of operations that are accomplished for each print job.

Figure 1A:
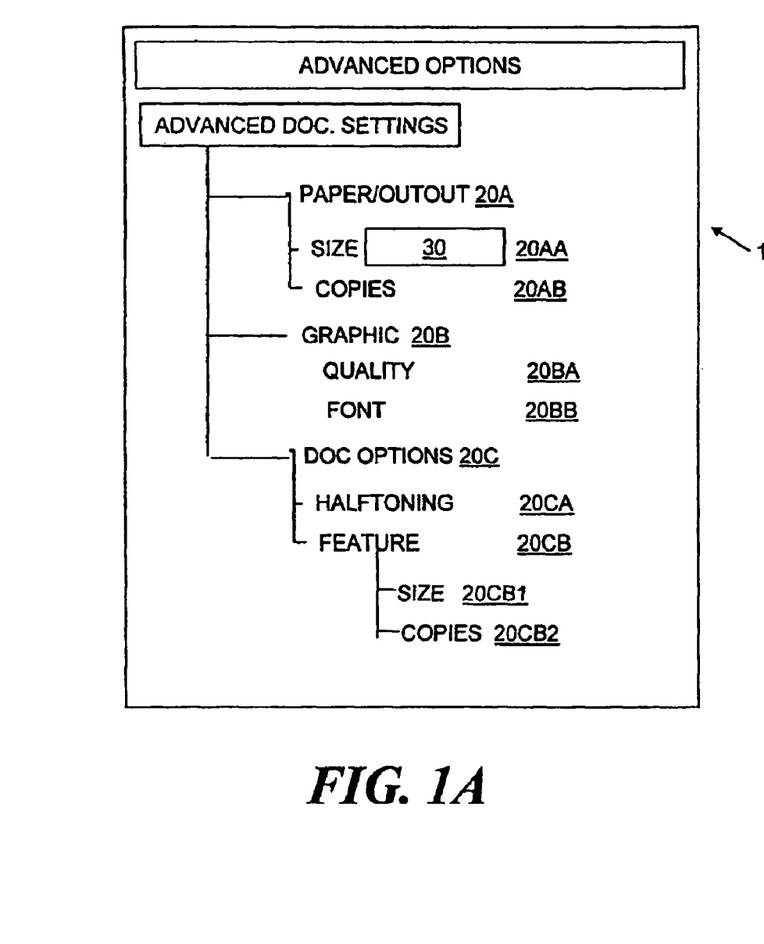
FIG. 1A is a graphical representation of the treeview.

One example of a table-driven driver is the Universal Printer Driver (UNIDRV) provided as part of the WINDOWS™ operating system. A very basic UNIDRV solution can be implemented without writing any code. To control the behavior of the printer, a printer driver solution provides a user-interface (UI) having dialog boxes and property sheets. The UI allows a user to control how output appears on the printed page and provides the user with printing options, such as paper sizes that are supported by the printer. Typically, printer manufacturers control the look and feel of the UI. Although the UI supplied with UNIDRV, known as the "treeview," can be customized to some extent, the overall look and feel of the UI can not be readily manipulated. As shown in FIG. 1A, the treeview is a structured list of settings that aligns the settings horizontally at predetermined positions. Another limitation of the UNIDRV is that is does not filter the options that are shown in the treeview. For example, all paper formats and sizes are shown in the treeview, even if the connected printer does not actually supports those formats and sizes. For example, the option to print on A4 paper is provided to the user even if the printer cannot print on A4 paper.

Another limitation of the UNIDRV is the lack of the ability to provide color management dependant upon whether text or graphics is being printed. If the line being printed contains both text and graphics, UNIDRV prints all black pixels using a combination of CMYK instead of using pure black to print the text portions of the line. Similarly, UNIDRV only allows a single half-tone screen for each line of printing. If the line contains both text and graphics, a smooth half-tone screen is applied to all pixels, even though it is desirable to apply a detail half-tone screen to the text and vector graphics portions of the print job.

Additionally, most commercial printers are shipped with a resident hypertext transport protocol (HTTP) server. This server provides printer status information and requires a complex USBDOT4 protocol used in conjunction with a custom I/O driver resident on both the client computer and the printer. Serving HTML pages through this interface increases the amount of traffic through the interface, which, in turn, slows responsiveness.

Therefore, a need exists for an extension of the UNIDRV that allows for the customization of the UI, facilitates the ability to control the options presented in the UI, that provides various printing enhancement features such as multiple forms of color management and the use of multiple half-tone screens on a pixel-by-pixel basis, and that provides printer status information.

SUMMARY OF THE INVENTION

The present invention provides an extension to the UNIDRV solution that allows a manufacturer to customize the look and feel of the UI. The extension improves the speed of printer status reports and improves the overall printer performance by facilitating the use of color management and the application of multiple half-tone screens on a pixel-by-pixel basis.

In one aspect, the invention is directed to a method of customizing a standard user interface associated with a universal printer drive. The method includes the steps of associating an item of a standard user interface data structure to a first object, associating an item of a customized user interface to a second object, linking the first object to the second object through a software interface, and displaying the customized user interface. The software interface facilitates communication between the first object and the second object.

In various embodiments, the step of displaying includes accessing a definition file. The definition file includes information related to the customized user interface. The information related to the customized user interface can include at least one additional item compatible with the standard user interface structure.

The method can also include the step of filtering at least one item of the standard user interface data structure prior to the displaying step. The filtering step includes writing to a file. The file includes data related to a state of at least one constant. The state of the at least one constant being determinative of inclusion in the standard user interface data structure.

In another aspect, the invention is directed to computer software, residing on a computer-readable storage medium, including a set of instructions that cause a computer to customize a standard user interface associated with a universal printer driver by associating an item of a standard user interface data structure to a first object, associating an item of a customized user interface to a second object, linking the first object to the second object through a software interface, and displaying the customized user interface. The software interface facilitates communication between the first object and the second object.

In another aspect, the invention is directed to a method of extending rendering functionality of a standard universal printer driver. The method includes the steps of generating a tagging bitmap and intercepting a drawing call to a banding bitmap of the standard universal driver. The tagging bitmap has substantially similar boundaries as a banding bitmap. The banding bitmap is used in rendering image information. The drawing call includes a drawing function and an object type related to the drawing function. The method also includes the steps of storing the object type associated with the drawing call in the tagging bitmap, performing error correction of the object type stored in the tagging bitmap, and incorporating the object type stored in the tagging bitmap with the image information of the banding bitmap to render a final output.

In various embodiments, the method includes the step of preprocessing the image information of the banding bitmap by alpha-blending a watermark image with the image information. The step of performing error correction includes performing error correction for raster operation functions.

In another embodiment, the step of storing includes storing information related to a half-tone filter. The information related to the half-tone filter includes information determinative of the half-tone filter to apply to the image information on a pixel-by-pixel basis. The step of storing can also include storing information related to color management, such as converting from an input color space to an output color space on a pixel-by-pixel basis and black-generation. In additional embodiments, the information stored in the tagging bitmap facilitates white space skipping and transition determination.

In another aspect, the invention is directed to a method of providing printer status information. The method includes the steps of using a field in a printer status page to generate a simple network management protocol request; communicating the simple network management protocol request to a simple network management protocol server resident on at least one of a remote printer and a remote printer server; translating the simple network management protocol response provided by the at least one of the remote printer and the remote printer server into a format usable by the printer status page, and inserting the translated simple network management protocol response into the field of the printer status page.

In one embodiment, the printer status page is viewable by a web browser and is comprised of hypertext markup language.

In another embodiment, communicating step includes communicating the simple network management protocol request from a computer to the at least one of the remote printer and the remote printer server using a standard universal serial bus driver.

In an alternative embodiment, the communicating step includes communicating the simple network management protocol request from a computer to the at least one of the remote printer and the remote printer server using a standard networking protocol. The standard networking protocol can be selected from the group consisting of internetwork packet exchange, transition control protocol/internet protocol, file transfer protocol, and user datagram protocol.

BRIEF DESCRIPTION OF THE DRAWINGS

The invention is pointed out with particularity in the appended claims. The advantages of the invention may be better understood by referring to the following description taken in conjunction with the accompanying drawing in which:

FIG. 1 is a prior art diagram of the treeview associated with the UNIDRV;

DETAILED DESCRIPTION OF THE INVENTION

The present invention extends the functionality of a standard WINDOWS printer driver, (e.g., the UNIDRV or the PSCRIPT) by providing the ability to customize the UI, enhance the printer performance by providing the ability to use multiple half-tone screens and multiple forms of color management, and to display printer status without the need for an HTTP server resident at the printer. In one embodiment, the present invention is a software "plug-in" module configured to provide at least one of these features. The plug-in communicates with the core UNIDRV code provided as part of the operating system. The IPrintOemUni COM interface facilitates communication between the core UNIDRV code and the software plug-in of the present invention.

FIG. 1A depicts one embodiment of a treeview 10 of the UNIDRV. The standard UI 10 contains a list of control parameters (20A, 20B, 20C, referred to generally as 20) that are aligned horizontally at predetermined stop-tab positions. Examples of control parameters 20 can include, but are not limited to, paper/output, graphic, and document options. Each of the control parameters 20A, 20B, 20C, can have additional sub-parameters (20AA, 20AB, 20BA, 20BB, 20CA, ...). Examples of sub-parameters can include, but are not limited to, paper size, copy count, print quality, true type font, advanced printing features, half toning, print optimization, and printer features. The sub-parameters can also have their own sub-parameters (20CB1, 20CB2, ...) such as, economode and graphics mode. Each of the parameters controls a different aspect of the printer driver functionality.

To change the settings of one of the parameters 20, a user selects the specific parameter with a mouse or similar device. The appearance of the parameter changes from a display-only style to a data selection style. For example, the parameter 20 can become a combo-box 30. The combo-box 30 contains a list of entries that are selectable for the parameter. For example, if paper size is selected the combo-box can contain a list that includes A4, legal, and letter.

Figure 1B:
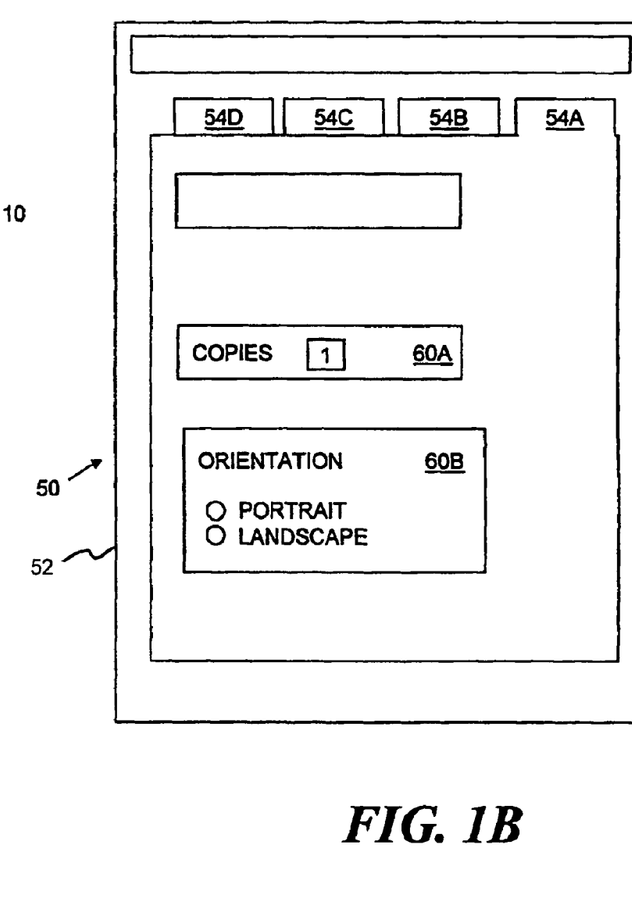
FIG. 1B is a graphical representation of an embodiment of a customized user interface constructed in accordance with the principles of the invention.

FIG. 1B depicts an embodiment of a customized UI 50. The customized UI includes a dialog box 52 and a plurality of dialog page tabs 54A, 54B, 54C, 54D, (referred to generally as 54). Selecting a respective page tab 54 displays configurable options to a user of the customized UI. For example, selecting the "basic" tab 54A displays configurable items 60A, 60B (referred to generally as items 60) to the user. The items 60 facilitate control of certain aspects of the printer, e.g., number of copies and the orientation of the printed page. The item 60 can be manipulated by radio buttons, combo-boxes, and other well know methods.

Figure 2:
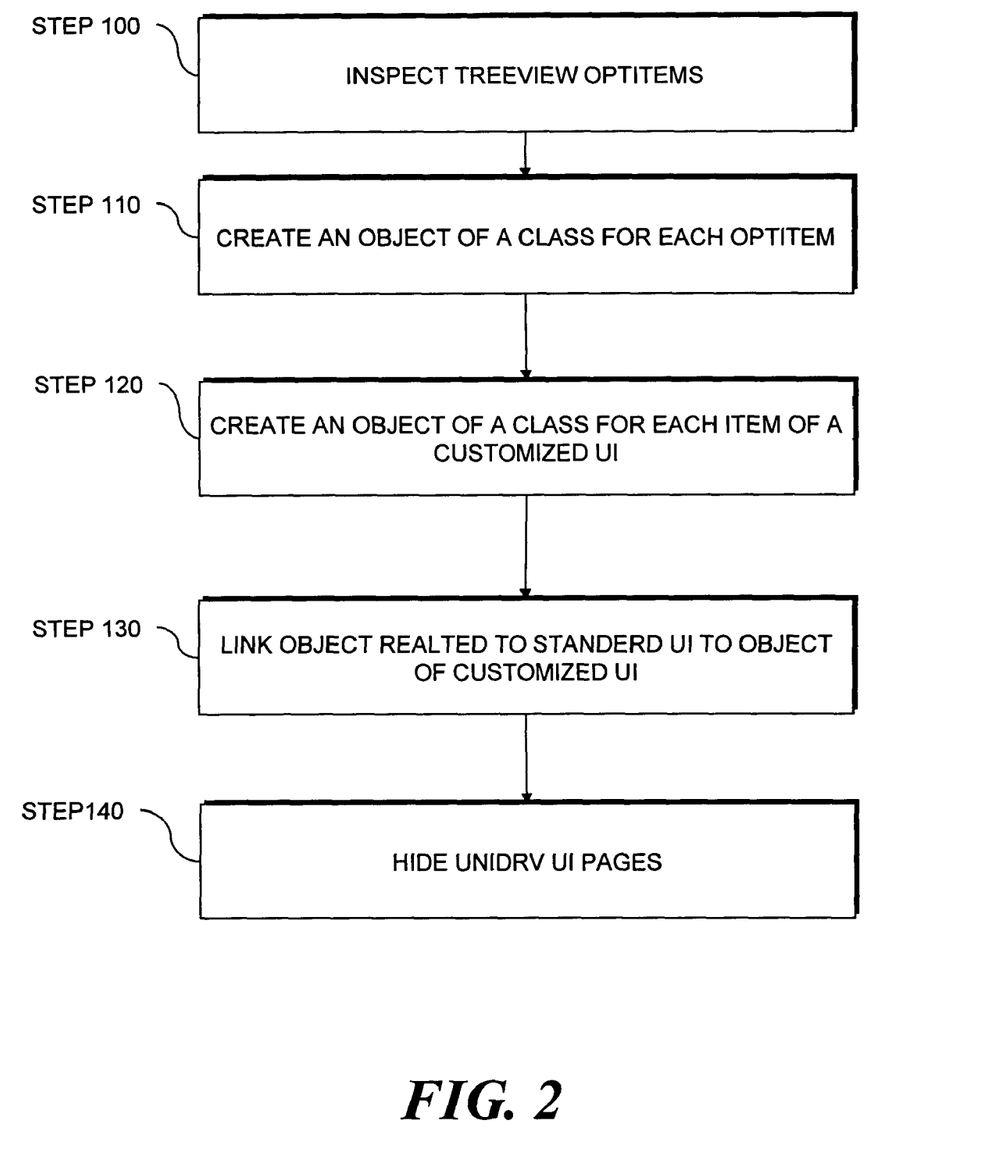
FIG. 2 is a flow chart of depicting the steps of creating a customized user interface.

With reference to FIGS. 1A, 1B, and 2, the standard UI 10 provided as part of the UNIDRV is replaced with a customizable UI 50. In more detail, each parameter 20 of the treeview 10 is a piece of software code known as an OPTITEM. An OPTITEM is a C programming language structure that is used by common property sheet user interface (CPSUI) applications (including printer interface DLLs) for describing one property sheet option on a property sheet page. In one embodiment of the present invention, each OPTITEM is inspected (STEP 100). There are various forms of OPTITEMs. Two typical examples are lists, which contain one or more entries, and values, which are typically alphanumeric in nature. Based on the category of the OPTITEM, and object of a class OPTITEMHANDLER is created (STEP 110). Each OPTITEMHANDLER instance is associated with a respective OPTITEM of the treeview 10 and can communicate with the OPTITEM to perform certain functions, e.g., get/set values, enumerate all entries, enable, disable, hide and show. Also, each instance of the OPTITEMHANLDER class includes a standard interface configured to allow a client of the OPTITEMHANDLER access to the OPTITEMHANDLER in a unified manner. As such, a layer is created that allows management of the OPTITEMs in the treeview 10. A variety of actions can be performed on the OPTITEMs of the treeview 10 as a result of this layer (e.g., get/set a current value, enumerate all items in a list, enable/disable a single item in a list, enable/disable an item, remove an entry of a list, and hide/show OPTITEMs) without actually changing the OPTITEM by selecting the OPTITEM in the treeview 10.

Each item 60 of the customized UI 50 can also be represented as a piece of software code. Based on the category of the item 60 an object of a class DlgLink is created (STEP 120). Each object is associated with a respective item of the customized UI 50 and can communicate with the item 60 to perform certain functions, e.g., get/set values, enumerate all entries, enable, disable, hide and show. Also, each instance of the DlgLink class includes a standard interface configured to allow a client of the object to access to the object in a unified manner. In this manner, a layer is created that allows management of the items in the customized UI 50.

Each of the respective OPTITEMHANLDER objects is linked to an object associated with an item 60 of the customized UI (STEP 130). In other words, each parameter 20 of the treeview 10 is linked to an item 60 of the customized UI 50 via a software interface. The link can be established by a fixed assignment of an OPTITEM ID to a customized UI control ID. Alternatively, the link can be established dynamically by loading linking information from a file, such as, an object definition file (ODF), which is described in more detail below. The software interface isolates the implementation details of the treeview 10 and the implementation details of the customized UI 50 from each other. This separation enables constraint logic and other user interface logic to operate on the hierarchy of treeview parameters 20 without creating dependencies related to how the controls are represented in the customized UI 50.

Once each OPTITEM of the treeview 10 is linked to an appropriate customized UI control 60, the standard UI can be replaced. In addition to the treeview 10, the UNIDRV generates two standard dialog pages "Layout" and "Paper/Quality". These pages and the treeview 10 are hidden from the user when the customized user interface is created (STEP 140). These pages are still generated by the UNIDRV; however, they are not displayed to the user. Instead, only the customized user interface is shown. More specifically, the state of all of the OPTITEMs in the treeview 10 is set to "hidden", except for the "Orientation" control, which is used to specify portrait or landscape mode. In response, the UNIDRV automatically hides the "Paper/Quality" tab. In contrast, the "Layout" tab generated by the UNIDRV can not be hidden. As a result, the existing dialog box generated by the UNIDRV must be redefined. More specifically, the Title/Caption text of the dialog box is replaced different text name. Also, all UI controls contained in the layout tab are redefined to an off-screen location so they can not be seen by the user. Then, the desired customized controls are created dynamically and arranged on the now empty layout tab. The layout tab control needs to be present in order to not disturb the internal operations of the UNIDRV. The additional tabs can be created and displayed in a standard manner.

In addition to replacing the standard UI with a custom UI, in one embodiment the present invention facilitates control of the extended functionality of the UNIDRV described herein through the use of the ODF. The ODF provides the ability to define additional UI elements and their respective settings. The ODF is a text based parameter file. Each driver created is associated with a specific ODF. For example, if a computer is able to print to both a laser printer and an ink jet printer a different driver is required to print to the respective printers. The present invention facilities the creation and control of a different UI for each respective driver. As such, an ODF for each driver is required. While described as a stand-alone file, the ODF can be incorporated into a file included with the UNIDRV as described in more detail below.

The parameters defined in the ODF are compiled at driver installation. The complied form of the ODF is stored with the other printer driver settings in the Windows registry. This facilities access to the information contained in the ODF. Examples of entries in the ODF can include data structures, additional OPTITEMs, UI behavior of the additional OPTITEMs, and the UI behavior of the driver.

In one embodiment, the invention includes the ability to filter the printer features reported to an application, e.g., Word, Excel, or PowerPoint. The UNIDRV includes a generic printer description (GPD), which contains information about the printer features that UNIDRV presents in the UI to allow the user to configure the printer. The GPD file can also include the information contained in an ODF as described above. For example, a GPD file may specify five different paper formats: A4, LETTER, LEGAL, B4, A3. The GPD file may also specify two different paper feeder options: option 1 contains a MANUAL source and option 2 contains a tray-1 source. For a given printer, the manual feeder can accept all papers sizes and tray-1 can only hold A4, LETTER, and LEGAL paper sizes. The UNIDRV does not display a filtered set of choices to the user if the user selects tray-1 as the paper source. Instead, the user will be allowed to select a paper size of B4 even though tray-1 does not support that option.

In one embodiment of the invention, a GPD "include" file is created that defines which options are displayed to the user. The include file contains constants that are determinative of whether or not an option is displayed in the customized UI 60. The use of the include file provides advantages such as dynamic form to tray assignment in the customized UI, dynamic media type to tray assignment in the customized UI, and the ability to enable and disable document preference features in response to the printer property features.

Another aspect of the invention extends the rendering functionality of the UNIDRV. Rendering refers to actions and procedures that are necessary to control the creation of print jobs, printed pages, and the actual imaging of objects on the created pages. Additionally, rendering relates to color management, half toning, and compression. Object specific half toning and color management require that tagging information be associated with each pixel of a final printed product. As mentioned above, the UNIDRV does not use object tagging information during the rendering process.

Figure 3:
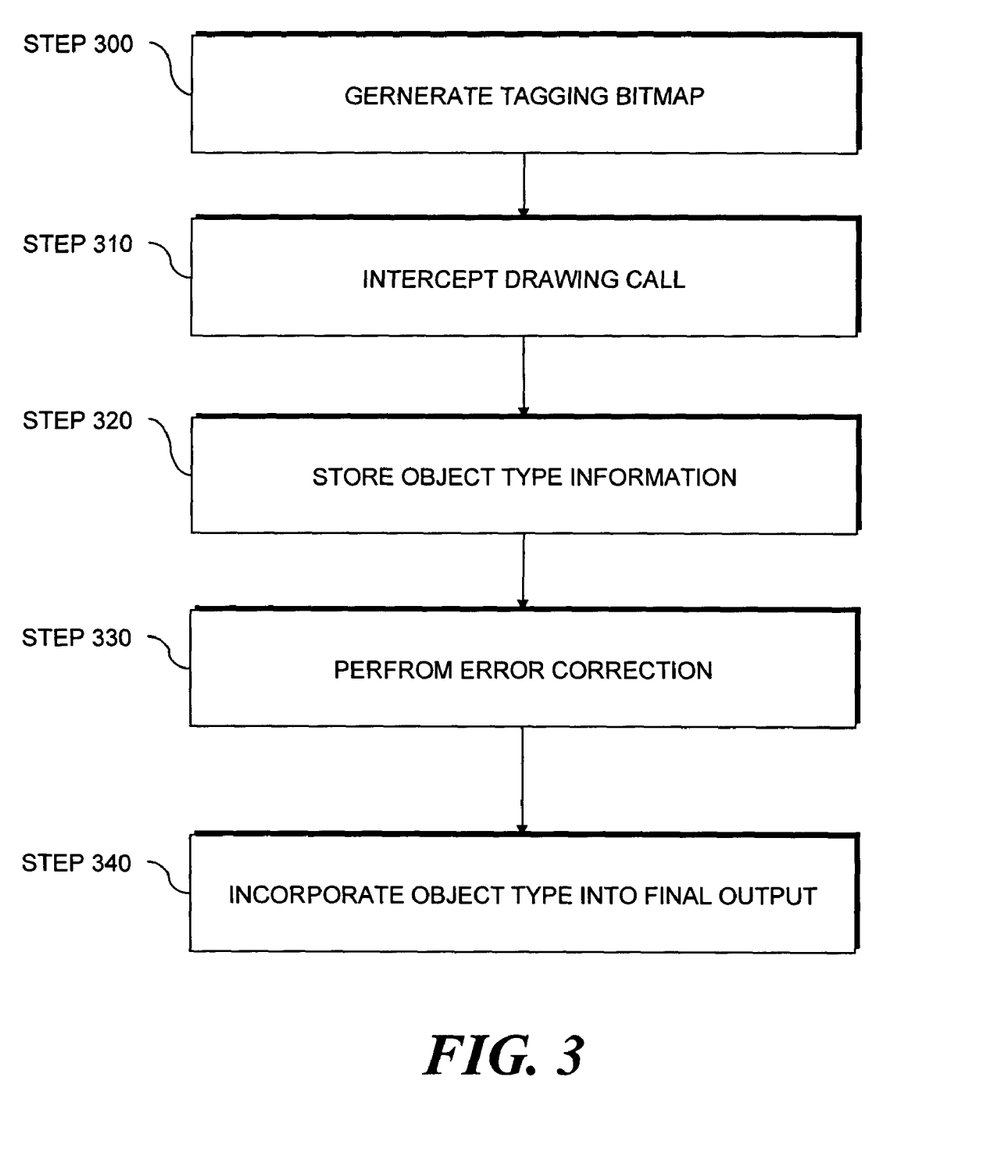
FIG. 3 is a flow chart of depicting the steps of extending the rendering functionality.

With reference to FIG. 3, in one embodiment of the present invention an object type tagging bitmap is created (STEP 300). The object type tagging bitmap is substantially similar in size as a banding bitmap used by the UNIDRV to render each band of the imagining information for the final printed page. Additionally, various brushes are created. Brushes are descriptions of objects that are used to fill areas of the object type tagging bitmap. Traditionally, brushes hold a specific color value. In the present invention, the brushes contain bitwise information or a combination of all the different type tag bits used. For example, the object type tagging information can be related to a specific form of black generation or a specific form of half-toning. The tagging information can also be used in edge transition determination processes and also for white-space skipping. In one embodiment, an additional four bits of information is stored in the object type tagging bitmap for each pixel of the final product; however, additional bit sizes can be used.

Drawing calls that are made to the banding surface are intercepted (STEP 310). The actual drawing operations are not modified or changed. Each drawing call includes a drawing function and an object type related to that drawing function. The object type information associated with the drawing function is stored in the object type tagging bitmap (STEP 320). In one embodiment, the same input parameters of the DRV drawing call are passed to the analogous ENG function, which records the object type information in the object type tagging bitmap.

For example, a routine to intercept a drawing call can be implemented according to the following pseudo-code:

```
DrvBitBlt( SOURCE, PATTERN, DESTINATION, COORDINATES, ROP )
{
        Is SOURCE present and ROP includes SOURCE ?
        {
        Mark object tag bitmap according to error correction rules described in more
        detail below with image-specific marking brush (use COORDINATES to specify
        area). Use EngBitBlt to mark.
        }
    else
        {      // Deprecated special case
        Mark object tag bitmap according to rules set forth in d) with vector-specific
        marking brush (use COORDINATES to specify area). Use EngBitBlt to mark.
        }
        UNIDrvBitBlt( SOURCE, PATTERN, DESTINATION, COORDINATES, ROP)
}
```

In one embodiment, the plug-in provides a set of user defined drawings functions that replace the equivalent drawing function provided by the UNIDRV. The set of drawing functions can include, for example, DrvAlphaBlend, DrvBitBlt, DrvCopyBits, DrvFillPath, DrvGradientFill, DrvLineTo, DrvPaint, DrvPlgBlt, DrvStretchBlt, DrvStretchBltROP, DrvStrokeAndFillPath, DrvStrokePath, DrvTextOut, and DrvTransparentBlt. Pseudo-code for one of these function can be implemented as follows:
// XXXX: is placeholder for any of the above function names, e.g. BitBlt
// YYYY: placeholder for any one of brushProcessSmooth, brushProcessLineArt, etc . . . , selected based upon the type of function XXXX that is implemented
DrvXXXX(parameters)

```
    {
    // first store the object type tag bits
    DevOEM->ObjectTypeTagXXXX( parameters, brushYYYY );
    // Now call original UNIDRV entry point to do actual object drawing
    fpUNIDRV_XXXX( parameters );
    }
DevOEM::ObjectTypeTagXXXX( parameters, brush )
    {
    // perform error correction as described in more detail below
    correctedROPorMIX= DevOEM->FixupROP( parameters );
    // Now call EngXXXX Drawing API to record object type info to the
    tagging bitmap
    EngXXXX( hObjectTag, parameters, correctedROPorMIX, brush);
    }
```

Error correction is performed (STEP 330) to ensure that the object type information stored in the tagging bitmap yields a meaningful result when incorporated with the image information to generate the final output. In one embodiment, the error correction is related to raster operations (ROP) and/or MIX mode requests. A ROP or MIX mode is a set of instructions that perform binary logical operations while drawing to the target surface. The logical operation performed by the ROP receives input parameters such as D (an existing pixel on the target surface), S (a pixel on the source surface), and P (a pixel in an arbitrary fill pattern), which are well known to those of ordinary skill in the art. Raster operations are often performed in sequences. Some of these operations can modify bits on the target surface in an unexpected fashion. As result, error correction is needed to ensure the object type information stored in the tagging bitmap generates a useful result.

To create the final output, the UNIDRV core code calls the IPrintOemUni::ImageProcessing function, which integrates the image information from the banding bitmap with the object type information stored in the tagging bitmap (STEP 340). In addition, a watermark is combined with the image information through alpha-blending. For example, the function can be implemented according to the following pseudo-code:

For (each pixel (x,y))

```
    {
    char c, m, y, k; // Resulting pixels, on(1) or off(0)
    long cmykValue; // Variable that holds color conversion result
    long rgbValue= GetPixel(x,y) * GetWatermarkPixel (x,y)
    int typetag= DevOEM->GetObjectTypeTag(x,y)
    // Do type specific color conversion by calling appropriate function
    if ( typetag & OBJMASK_4PLANE_BLACK)
        cmykValue= RGB_To_CMYK_ProcessBlack( rgbValue )
    else
        cmykValue= RGB_To_CMYK_BlackOnly( rgbValue );
    if ( typetag & OBJMASK_SMOOTH_HALFTONE )
        {
        c= HalftoneSmooth_C( CyanValue(cmykValue));
        m= HalftoneSmooth_M( MagentaValue(cmykValue));
        y= HalftoneSmooth_Y( YellowValue(cmykValue));
        k= HalftoneSmooth_K( BlackValue(cmykValue));
        }
    else
        {
        c= HalftoneLineArt_C( CyanValue(cmykValue));
        m= HalftoneLineArt_M( MagentaValue(cmykValue));
        y= HalftoneLineArt_Y( YellowValue(cmykValue));
        k= HalftoneLineArt_K( BlackValue(cmykValue));
        }
    }
```

Figure 4:
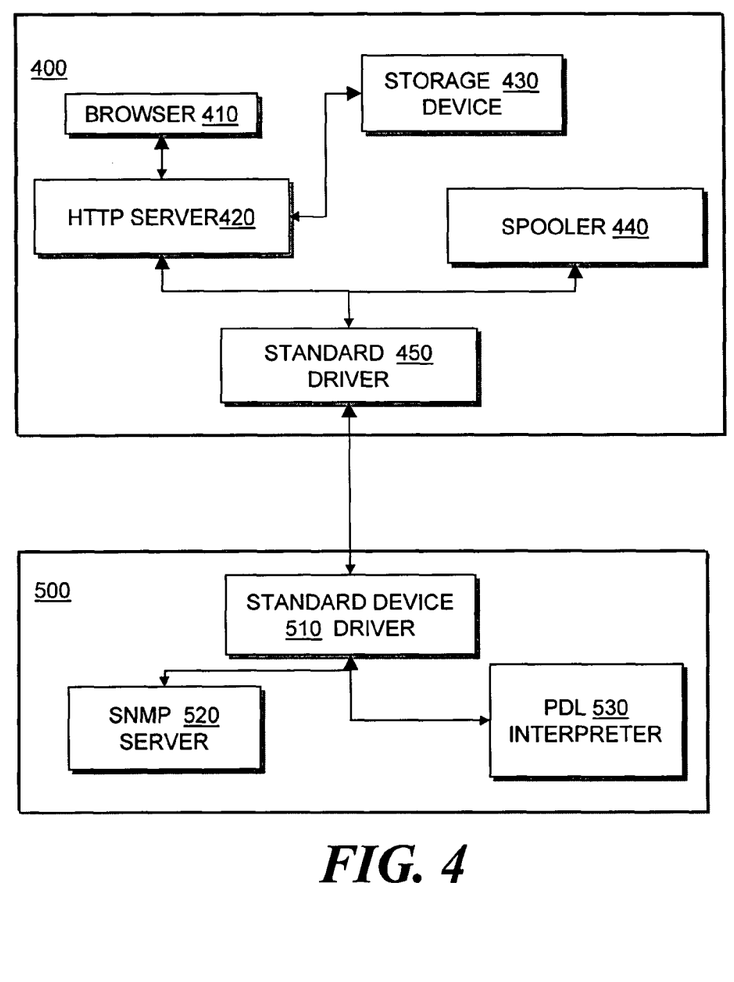
FIG. 4 is block diagram of an embodiment of a printing device status system according tot he principles of the present invention.

Another aspect of the invention is directed to a method of providing printer status information. With reference to FIG. 4, a computer 400 is in communication with a printing device 500. The printing device 500 can be, for example, a printer or a print server. The computer 400 includes a browser 410, a hypertext transfer protocol (HTTP) server 420, a storage device 430, a spooler 440 and a driver interface 450. The printing device 500 includes a standard device driver 510, a simple network management protocol (SNMP) server 520 and a page description language (PDL) interpreter 530.

The browser 410 is in communication with HTTP server 420. The browser can be a standard web browser. The HTTP server 420 is in communication with the storage device 430 and the standard drive 450. The HTTP server 420 can be implemented as software. The storage device can be a disk drive. The spooler 440 is in communication with standard driver 450 and manages print jobs. The standard driver 450 can be a universal serial bus (USB) driver. The stander driver 450 of the computer 400 is in communication with printer 500 via the standard device driver 510. The standard device driver 510 is complementary to the device driver 450. The standard device driver 510 is in communication with the SNMP server 520 and the PDL interpreter 530.

In operation, a user of the computer 400 requests the status of the printer 500 via the browser 410. The browser 410 sends an HTTP request to the HTTP server 420. In response the HTTP server 420 receives an HTML based status page stored in the storage device 430. Storing the HTML status pages in the storage device 430 reduces the traffic volume between the printing device 500 and the computer 400. The status page includes at least one field configured to receive information. The HTTP server 420 generates a SNMP request to retrieve the status information. The HTTP server 420 communicates the SNMP request to the standard driver 450, which in turn, forwards the request to the printing device 400. In one embodiment, the standard driver 450 uses a vendor specific command to send the SNMP request to the printing device 400.

The printing device 400 receives the SNMP request via the standard device driver 510. The SNMP server 520 receives the SNMP request from the standard device driver 510. In response the SNMP server 520 generates a response to the SNMP request. The response includes the status information requested by the user. The response is forwarded to the computer 400 via the standard device driver 510.

The computer 400 receives the response to the SNMP request at the standard driver 450, which, in turn, forwards the response to the HTTP server 420. The HTTP server 450 translates the SNMP response into a format that is useable by the printer status page, e.g., HTML. The translated response is inserted in the printer status page at the location defined by the field.

Having shown the preferred embodiments, one skilled in the art will realize that many variations are possible within the scope and spirit of the claimed invention. It is therefore the intention to limit the invention only by the scope of the claims.

What is claimed is:

1. A method of customizing a standard user interface associated with a universal printer driver comprising the steps of:
    associating each item of a first plurality of items of a standard user interface data structure associated with the universal printer driver with a respective first object of a first plurality of first objects, each first object of the first plurality of first objects communicating with the universal printer driver and each first object of the first plurality of first objects having a first object interface through which it communicates with a respective item of the first plurality of items;
    associating each item of a second plurality of items of a customized user interface with a respective second object of a second plurality of second objects, each second object of the second plurality of second objects having a second object interface through which it communicates with a respective item of the second plurality of items;
    linking a first identifier of each respective first object of the first plurality of first objects to a second identifier of each respective second object of the second plurality of second objects through a software interface, the software interface facilitating communication between each respective first and second object that are linked together by linking the first object interface of the respective first object to the second object interface of the respective second object;
    setting a parameter of each respective item of the first plurality of items of the standard user interface data structure to a value that hides each respective item of the first plurality of items of the standard user interface data structure from view of a user;
    replacing the standard user interface with the customized user interface;
    displaying only the customized user interface while hiding the standard user interface from the view of the user; and
    enabling each item of the second plurality of items to communicate with the universal printer driver through the customized user interface by accessing each respective first object of the first plurality of first objects through the respective second object to which it is linked.

2. The method of claim 1 wherein the step of displaying comprises accessing a definition file, the definition file comprising information related to the customized user interface.

3. The method of claim 2 wherein the information related to the customized user interface comprises at least one additional item compatible with the standard user interface structure.

4. The method of claim 1 further comprising the step of filtering at least one item of the standard user interface data structure based upon whether the at least one item is supported by a printer selected by the user prior to the displaying step.

5. The method of 4 wherein the filtering step comprises writing to a file, the file comprising data related to a state of at least one constant, the state of the at least one constant being determinative of inclusion in the standard user interface data structure.

6. The method of claim 1, further comprising a step of extending a rendering capability of the universal printer driver by associating object type information with a banding bitmap of the universal printer driver, the banding bitmap for use in rendering image information, wherein the step of extending the rendering capability of the universal printer driver includes:
    generating a tagging bitmap, the tagging bitmap having substantially similar boundaries as the banding bitmap of the universal printer driver;
    intercepting a drawing call to the banding bitmap, the drawing call comprising a drawing function and an object type related to the drawing function;
    storing the object type associated with the drawing call in the tagging bitmap;
    performing error correction of the object type stored in the tagging bitmap; and
    incorporating the object type stored in the tagging bitmap with the image information of the banding bitmap to render a final output.

7. The method of claim 6, further comprising a step of preprocessing the image information of the banding bitmap by alpha-blending a watermark image with the image information.

8. The method of claim 6, wherein the step of performing error correction comprises performing error correction related to raster operation functions.

9. The method of claim 6, wherein the step of storing comprises storing information related to a half-tone filter.

10. The method of claim 9, wherein the information related to the half-tone filter comprises information determinative of the half-tone filter to apply to the image information on a pixel by pixel basis.

11. The method of claim 6, wherein the step of storing comprises storing information related to color management.

12. The method of claim 11, wherein the color management relates to converting from an input color space to an output color space on a pixel-by-pixel basis.

13. The method of claim 11, wherein the color management relates to black-generation.

14. The method of claim 6, wherein the object type stored in the tagging bitmap facilitates white space skipping.

15. The method of claim 6, wherein the object type stored in the tagging bitmap facilitates transition determination.

16. Computer software, residing on a non-transitory computer-readable storage medium, comprising a set of instructions that cause a computer to customize a standard user interface associated with a universal printer driver by:

associating each item of a first plurality of items of a standard user interface data structure associated with the universal printer driver with a respective first object of a first plurality of first objects, each first object of the first plurality of first objects communicating with the universal printer driver and each first object of the first plurality of first objects having a first object interface through which it communicates with a respective item of the first plurality of items;

associating each item of a second plurality of items of a customized user interface with a respective second object of a second plurality of second objects, each second object of the second plurality of second objects having a second object interface through which it communicates with a respective item of the second plurality of items;

linking a first identifier of each respective first object of the first plurality of first objects to a second identifier of each respective second object of the second plurality of second objects through a software interface, the software interface facilitating communication between each respective first and second object that are linked together by linking the first object interface of the respective first object to the second object interface of the respective second object;

setting a parameter of each respective item of the first plurality of items of the standard user interface data structure to a value that hides each respective item of the first plurality of items of the standard user interface data structure from view of a user;

replacing the standard user interface with the customized user interface; and displaying only the customized user interface while hiding the standard user interface from the view of the user; and enabling each item of the second plurality of items to communicate with the universal printer driver through the customized user interface by accessing each respective first object of the first plurality of first objects through the respective second object to which it is linked.

17. The computer software of claim 16, wherein the set of instructions further cause the computer to customize the standard interface associated with the universal printer driver by extending a rendering capability of the universal printer driver by associating object type information with a banding bitmap of the universal printer driver, the banding bitmap for use in rendering image information, wherein extending the rendering capability of the universal printer driver includes:

generating a tagging bitmap, the tagging bitmap having substantially similar boundaries as the banding bitmap of the universal printer driver;

intercepting a drawing call to the banding bitmap, the drawing call comprising a drawing function and an object type related to the drawing function;

storing the object type associated with the drawing call in the tagging bitmap;

performing error correction of the object type stored in the tagging bitmap; and incorporating the object type stored in the tagging bitmap with the image information of the banding bitmap to render a final output.

* * * * *